United States Patent

[11] 3,602,248

| [72] | Inventor | Richard C. Peacock<br>2726 Wai Wai Loop, Honolulu, Hawaii 96819 |
|---|---|---|
| [21] | Appl. No. | 864,782 |
| [22] | Filed | Oct. 8, 1969 |
| [45] | Patented | Aug. 31, 1971 |

[54] TERMITE CONTROL SYSTEM
3 Claims, 3 Drawing Figs.

[52] U.S. Cl. .................................................. 137/357,
43/124, 239/568, 239/601
[51] Int. Cl. ............................................................ A01m 1/20
[50] Field of Search........................................... 52/101,
517, 169, 173; 137/357; 43/124; 239/568, 601

[56] References Cited
UNITED STATES PATENTS
1,795,488  3/1931  Hill.............................. 43/124

| 2,347,776 | 5/1944 | Gunn............................ | 52/517 X |
| 2,842,892 | 7/1958 | Aldridge et al. ............... | 52/169 |
| 2,915,848 | 12/1959 | Griffin............................ | 43/124 |
| 2,981,025 | 4/1961 | Woodson ....................... | 43/124 |
| 3,151,746 | 10/1964 | Reustle et al. ................. | 43/124 |
| 3,209,485 | 10/1965 | Griffin............................ | 43/124 |
| 3,330,062 | 7/1967 | Garter............................ | 43/124 |
| 2,095,770 | 10/1937 | Sorensen................... | 251/DIG. 13 UX |
| 1,966,572 | 7/1934 | Webb............................ | 239/568 X |

Primary Examiner—Henry T. Klinksiek
Attorneys—Clarence A. O'Brien and Harvey B. Jacobson ABSTRACT: A pipe system is laid out according to the floor plan of a structure and is disposed below the structure foundation slab. Pump means communicate with the pipe system to cause circulation of insecticide. The pipe members have apertures formed therein to permit the distribution of insecticide into the ground thereby preventing infestation by termites.

Richard C. Peacock
INVENTOR.

BY *Clarence A. O'Brien*
*and Harvey B. Jacobson*
Attorneys

TERMITE CONTROL SYSTEM

The present invention relates to an underground pipe system for infusing a surrounding ground area with insecticide.

Recent entomological studies indicate that ground termites have highly developed sensory glands and radarlike antennas or other detecting devices which enable them to seek out and attack wood by a direct route.

Experience has shown that ground termites generally attack load-bearing walls or other structural walls in order to gain access to interior wood. Strangely enough, the termite will make his way through hollow tile or brick in order to achieve his mark in the most direct manner. Termites construct tunnels through fissures in the building materials which quickly fill with moisture required to sustain insect life. By means of these tunnels, they gain access to adjoining wood structures. Experimental observation indicates that termites secrete an acid which tends to break down concrete at such points as construction joints, slab separations, hairline cracks and openings which the termites continue to enlarge until a tunnel through the joint or separation is completed. Once access to the wood is gained, the termite can begin extensive and costly damage to wood. At the present time, a standard treatment for termites is to drill holes along both sides of all foundation and other walls followed by the injection of insecticide into the holes. This causes saturation of the soil around the foundation with the intended result of repelling termites. In effect, this type of treatment lays down a toxic barrier under the entire house which does not necessarily kill termites but discourages them from gaining access to the structure. Although this process is used with some success, the benefits of a treatment are short in duration and the chemicals used do have a deteriorating effect on certain structural members.

In the construction of new building or other structure, exterminators are frequently called upon to permeate a foundation slab ground surface with suitable chemicals prior to the pouring of slab concrete. This process also creates a toxic barrier repelling termites from a course under the building. The chemicals are absorbed by the ground around the foundation walls for protection of the entire foundation structure. However, this preconstruction treatment also has its effectiveness terminated after a few years.

In the present invention, the conventional preconstruction treatment just discussed is followed before the concrete pour is made. However, the invention resides in providing a piping system under the foundation which infuses insecticide in the ground surrounding the foundation at predetermined intervals after the structure has been completed. Slots or apertures are formed in the piping so that the insecticide can flow into the ground along the pipe. Typically, the floor plan of the structure is utilized so that the piping is laid along all wall lines and posts, all plumbing and waterline laterals, and any structural section which is expected to include a wood floor at a future time.

By utilizing the piping of the present invention, permanent protection from termites can be realized. It is anticipated that relatively inexpensive and quickly installed materials can be employed so that insecticide may be distributed in the ground quickly, efficiently, and conveniently. The present invention has wide application in the construction arts and affords an opportunity for protection against termites and the like for homeowners as well as for business establishments.

These together with other objects and advantages which will become subsequently apparent reside in the details of construction and operation as more fully hereinafter described and claimed, reference being had to the accompanying drawings forming a part hereof, wherein like numerals refer to like parts throughout and in which:

Figure 2:
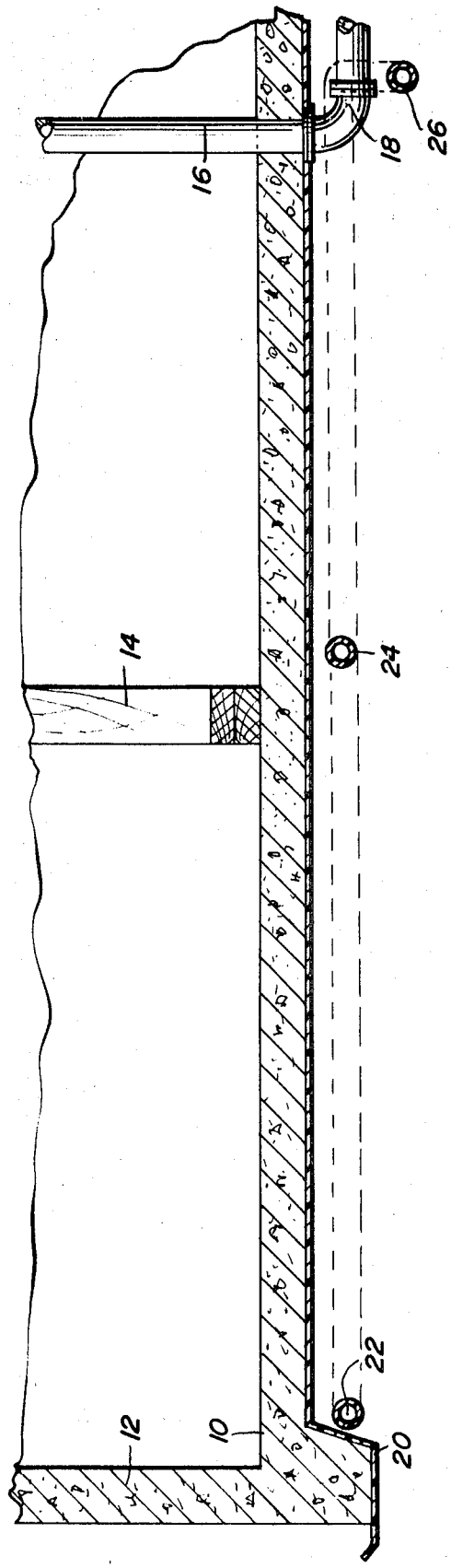
FIG. 2 is a sectional view through a concrete foundation slab illustrating relative disposition of insecticide-circulating pipes.

Referring to FIG. 2, a conventional foundation concrete slab is indicated by 10 and includes a lateral wall 12 extending upwardly therefrom. For purposes of illustration, the wood wall 14 is shown as rising above an intermediate section of the slab. Also, in the typical installation, a plumbing pipe 16 passes downwardly through the concrete slab 10 and is then joined to a horizontal section 18 for connection with the usual plumbing sources.

In order to construct a moisture barrier between the concrete slab 10 and the underlying ground, a plastic sheet 20 fabricated from polyethylene or the like separates the underside of the slab and the confronting ground. This barrier or sheet also protects against clogging of the tubes in the piping.

For maximum results, a tube or pipe section 22 should be disposed beneath the inner edge of the concrete slab 10. Likewise, a tube section 24 should be disposed in approximate alignment with the wood wall 14. Further, a tubing section 26 should be disposed below the plumbing pipe 16 which generates a moist bed for termites due to slow leaks in the fittings. With tube sections disposed as shown in FIG. 2, more vulnerable areas will be treated with insecticide so that superior protection against termites can be realized.

Figure 3:
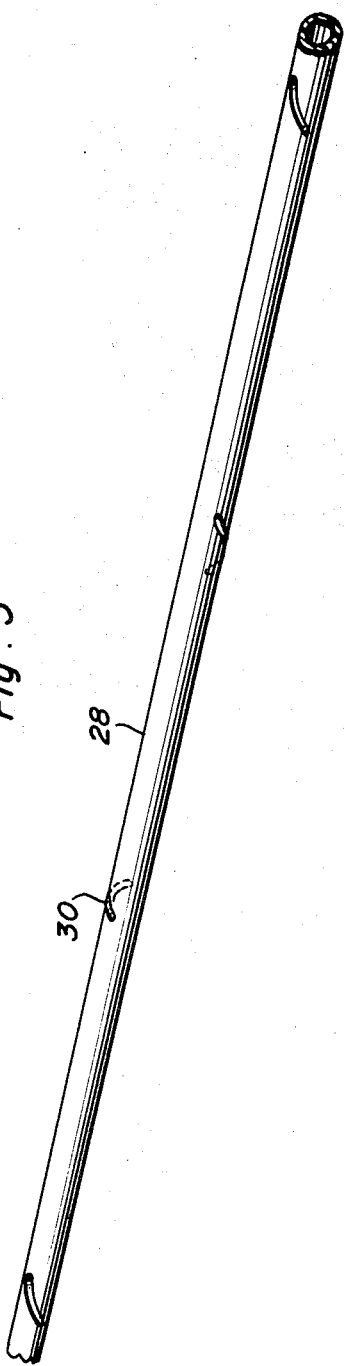
FIG. 3 is a perspective view illustrating a section of a tube to be used in the system of the present invention.

Referring to FIG. 3, a typical section of the tubing utilized in the invention is indicated by reference 28 and is seen to include spiral slots 30 or apertures winding around the main body of the tube. Thus, with the spiral formation of the slots, should a single slot become clogged, it is likely that an adjacent slot will still permit exit of insecticide due to continually changing angular displacement of the slots. In a preferred embodiment of the invention, the tubing or piping is fabricated from a highly stable plastic being particularly resistant to deterioration by chemicals and the weather elements.

Figure 1:
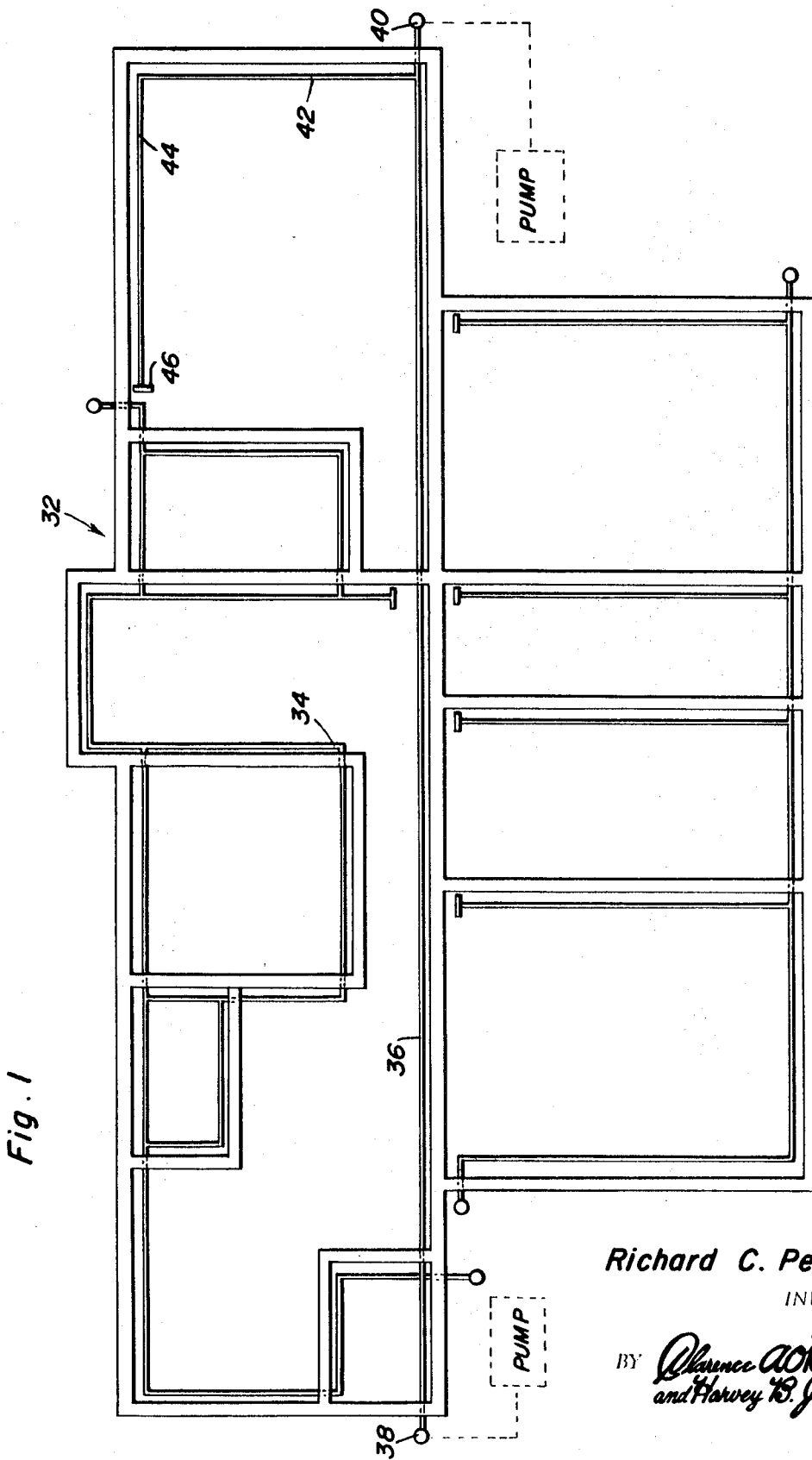
FIG. 1 represents a floor plan of a structure having the present pipe system laid under the foundation in a pattern following the floor plan.

Referring to FIG. 1, the piping in a typical layout generally indicated by reference numeral 32 includes a plurality of tube sections 34 following the general outline of a floor plan so that tube sections underline each and every wall of the structure.

In the case of large buildings and houses, there should be a plurality of parallel connected pipe branches so that a single tube branch does not become too long. Restricting the length of the tube branch helps to retain the greatest possibility of pressure along the entire piping. Preferably, there are at least two pump inlets 38 and 40 in each tube branch 36. Thus, if the tube clogs at one supply point, it would be possible to supply the associated tube branch from the other inlet point. As will further be seen from FIG. 1, a plurality of right-angled tube sections 42 and 44, connected at a first end to the pump inlet 40 finally terminate in a suitable closure fitting 46.

A working model of the present invention has been constructed by utilizing conventional tubing connectors, such as T-connectors. However, in development-type homes it may be desirable to prefabricate the tubing to a preselected floor plan pattern which can simply be placed in the ground without the necessity of connecting sections together. In either event, all tube sections should be flushed and tested before concrete is poured.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to falling within the scope of the invention.

What is claimed as new is as follows:

1. A pipe system for infusing insecticide under the foundation slab of a structure comprising pipe means laid adjacent the underside of the structure in a pattern generally limited to the areas adjacent to the weight-bearing walls of the structure, said pipe means including aperture means for discharging the insecticide and preventing unidirectional clogging.

2. The structure set forth in claim 1 wherein said aperture means includes a series of spiral-shaped openings formed in said pipe means.

3. The structure set forth in claim 1 wherein said pipe means is prefabricated in a pattern corresponding to areas adjacent to the weight-bearing walls of the structure.